June 5, 1923.
J. D. WILLIAMS ET AL
1,457,478
LEMON AND LIME SQUEEZER
Filed Dec. 30, 1920
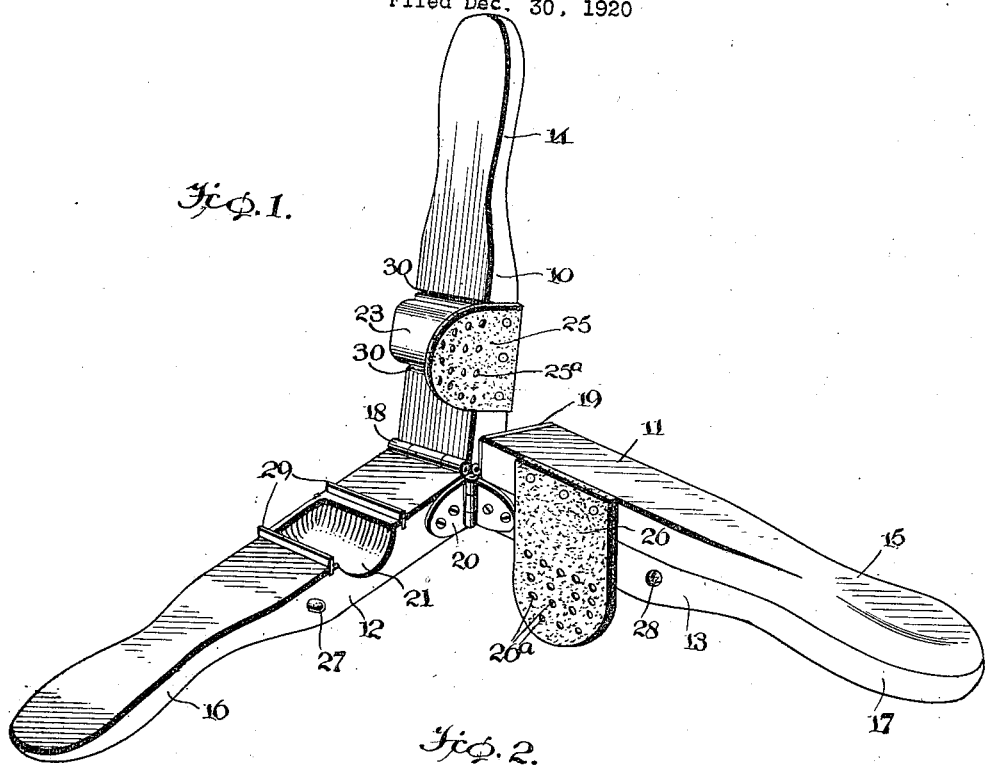
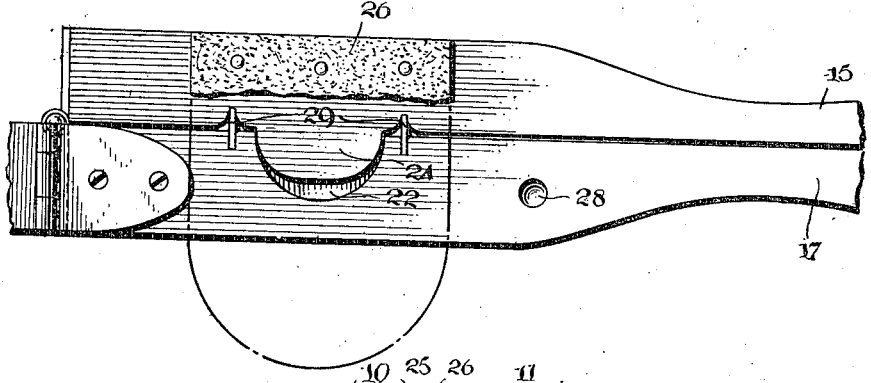
WITNESSES
R. E. Rousseau
W. F. Buckley
INVENTORS
Jack R. Bolton,
John D. Williams,
BY Felix L. Struve,
ATTORNEYS Patented June 5, 1923.

1,457,478

UNITED STATES PATENT OFFICE.

JOHN D. WILLIAMS AND JACK ROBERT BOLTON, OF SULPHUR SPRINGS, AND FELIX LOUIS STRUVE, OF GREENVILLE, TEXAS.

LEMON AND LIME SQUEEZER.

Application filed December 30, 1920. Serial No. 434,098.

*To all whom it may concern:*

Be it known that we, JOHN D. WILLIAMS and JACK R. BOLTON, residing at Sulphur Springs, in the county of Hopkins and State of Texas, and FELIX L. STRUVE, residing at Greenville, in the county of Hunt and State of Texas, all citizens of the United States, have made certain new and useful Improvements in Lemon and Lime Squeezers, of which the following is a specification.

The present invention relates in general to lime and lemon squeezers, and more particularly to an improvement in lime and lemon squeezers of that type forming the subject-matter of our former Patent No. 1,305,339.

The object of the invention is to provide a device of this character which is adapted to carry out with facility the cutting of the lemon or lime into sections and the squeezing of such sections as may be desired, and which is of simple and durable construction, reliable in operation and neat and attractive in appearance, and easy and inexpensive to manufacture.

Other objects and advantages of the invention reside in certain novel features of construction, combination and arrangement of parts as will be hereinafter more fully described and particularly pointed out in the appended claims, reference being had to the accompanying drawings forming part of this specification, and in which:

Figure 1 is a perspective view;

Figure 2 is a fragmentary view, in side elevation, of a pair of cooperating top sections, parts being broken away for the sake of illustration;

Figure 3 is a transverse vertical sectional view on a line taken centrally of the presser bars.

Referring to the drawings wherein for the sake of illustration is shown the preferred embodiment of the invention, it will be seen that the numerals 10 and 11 and 12 and 13 designate respectively the sections of coacting presser bars. Each presser bar section has integrally formed therewith a handle, the handles being designated at 14, 15 16 and 17. The presser bar sections 10 and 12 are hinged together by means of a hinged connection 18 and the presser bar sections 11 and 13 are hinged together independently of the sections 10 and 12 by means of a similar hinge 19. The presser bar sections 12 and 13 are also hinged together by means of the hinged connection 20, the hinged pin of which extends substantially at right angles to the hinge pins of the hinge connections 18 and 19, the latter being alined and co-planar.

A recess is provided to receive the lemon or lime, and is formed by quadri-spherical recesses 21 and 22 formed in the presser bar sections 12 and 13, respectively, and defining a semi-spherical recess adapted to receive the lemon or lime. The presser bars 10 and 11 are each provided with presser protuberances or bosses 23 and 24 adapted to coact respectively with the recesses 21 and 22 to effect the squeezing or pressing of the lemons or limes. The presser bars 10 and 12, and 11 and 13 thus constitute independent pressing units.

A cutter is provided for each pressing unit and comprises a cutting plate 25 secured to the presser bar 10 and depending therefrom and a cutter 26 fixed to the presser bar 11 and depending therefrom. These cutters or cutting blades are each adapted to traverse the recesses 21 and 22 in the space between the presser bars and they are each provided with a plurality of openings or perforations to permit the juice squeezed from the lemons or limes to discharge from the recesses. These perforations or openings are designated at 25[a] and 26[a], respectively.

In order to constrain the presser bars to move to proper position when associated to partake of their functions, the presser bar 12 is provided with a guide stud 27 adapted to cooperate with a guide recess 28 formed in the presser bar 13, and the presser bars 12 and 13 are each provided with a pair of guide strips designated at 29 and adapted to cooperate with guide slots designated at 30 formed in the presser bars 10 and 11.

In practice, a lemon or lime is placed in the recess constituted by the quadri-spherical recesses 21 and 22 and either the presser bars 10 and 12 or the presser bars 11 and 13 are brought together. This severs the lemon or lime and squeezes the sections thereof engaged by the presser bars being brought together. The other section remain undisturbed and may be subsequently squeezed by bringing the presser bars 10 and 12 together. It is to be noted that the severing of the lemon or lime and the squeezing or pressing thereof may be completely performed by operating either of the presser bar sections 10 and 12 or 11 and 13, as these presser bar sections are entirely independent and have independent cutters and independent presser protuberances or bosses and recesses. Perforations or openings 25ª and 26ª thus constitute lateral discharge openings for the expressed juice of the lemons, and this feature assists the other features of the invention in making each unit entirely independent and capable of completely performing the squeezing of the sections of the lemon or the like.

We claim:

1. In a device of the character described, coacting presser bars consisting of sections, hinged connections for independently connecting said sections to constitute pairs, a hinge connection for pivotally connecting said pairs of sections together, said presser bar sections having cooperating recesses and protuberances, a cutting blade for each pair of presser bar sections having a plurality of perforations therein to permit of the discharge of the expressed juice, and guiding means for said presser bar sections including a stud and recess, and guide strips and slots.

2. In a device of the character specified, a plurality of pairs of presser bar sections, means for independently pivotally connecting the sections constituting said pairs, means for pivotally connecting said pairs together, a cutting blade for each pair of sections, and guiding means for said sections.

3. In a device of the character specified, a plurality of pairs of presser bar sections, means for independently pivotally connecting the sections constituting said pairs, means for pivotally connecting said pairs together, and a cutting blade for each pair of sections.

4. In a device of the character specified, coacting presser bars, and a cutting blade for said presser bars having perforations constituting lateral discharge orifices for the expressed juice.

JOHN D. WILLIAMS.
JACK ROBERT BOLTON.
FELIX LOUIS STRUVE.